Aug. 16, 1927.                                                                 1,639,254
T. BOSSARD
VACUUM TANK FOR MOTOR VEHICLES
Filed Feb. 7, 1927                               2 Sheets-Sheet 1
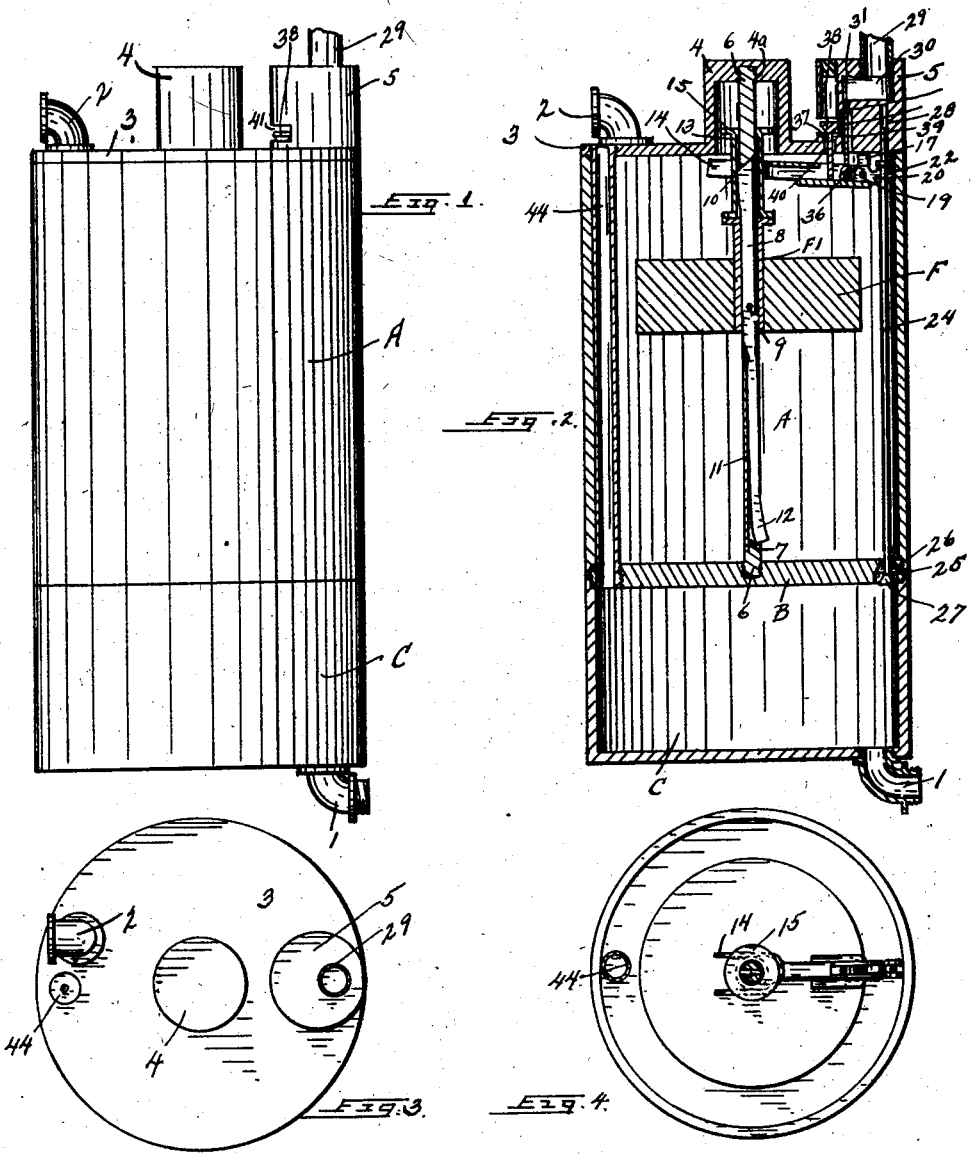
Inventor
Theodore Bossard
By R. M. Thomas.
Attorney

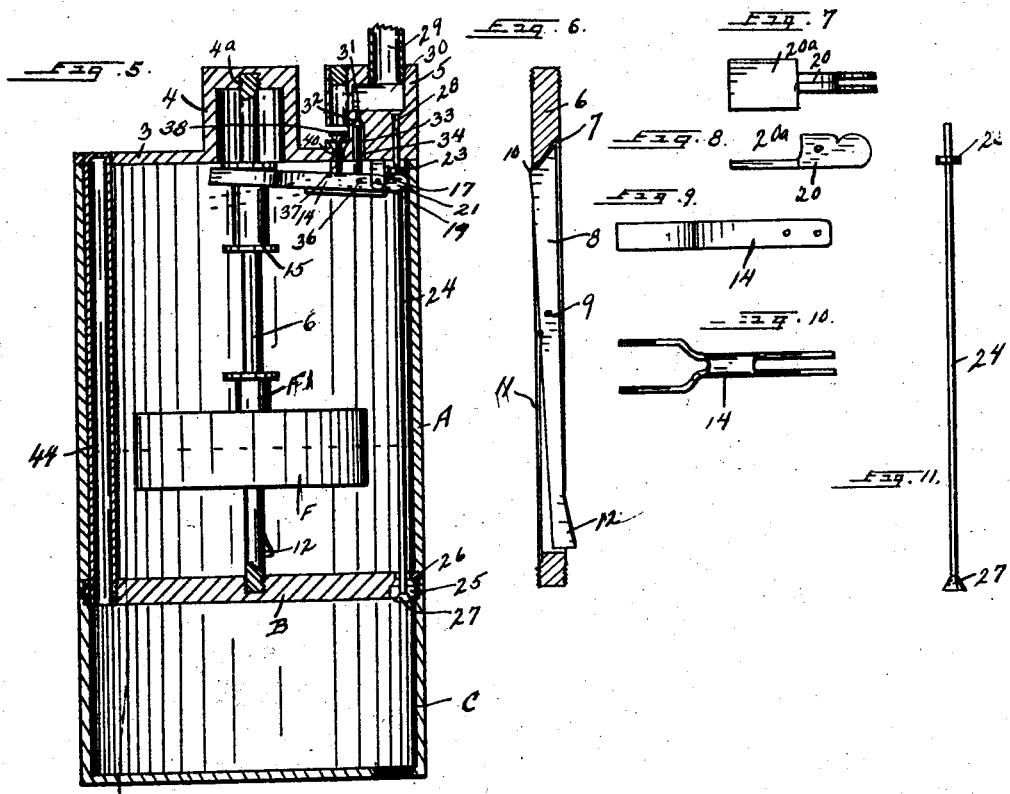

Patented Aug. 16, 1927.

1,639,254

UNITED STATES PATENT OFFICE.

THEODORE BOSSARD, OF SALT LAKE CITY, UTAH, ASSIGNOR TO NATIONAL PRODUCTS INCORPORATED.

VACUUM TANK FOR MOTOR VEHICLES.

Application filed February 7, 1927. Serial No. 166,466.

My invention relates to automobiles and has for its object to provide a new and efficient vacuum tank with which to supply fuel to the carburetor of the engine.

A further object is to provide a vacuum tank which will operate under low and high suction from the intake manifold of the engine.

A still further object is to provide a vacuum tank which will supply the fuel from the tank to the carburetor of the engine without loss of fuel or power to the engine and with high efficiency and economically.

A still further object is to provide an economically constructed vacuum tank for internal combustion engines which is efficient and which has no springs to weaken or break, and which will be fool-proof.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention Figure 1 is a side elevation of the tank. Figure 2 is a vertical diametrical section of the tank. Figure 3 is a plan view of the top of the tank. Figure 4 is a plan view of the tank with the top removed and parts sectioned. Figure 5 is a vertical diametrical section of the tank with the inner working parts shown in elevation. Figure 6 is a partial section of the centrally located float stem. Figure 7 is a plan view of the air valve control plate. Figure 8 is a side elevation of the same. Figure 9 is a side view of the float and valve control fork. Figure 10 is a plan view of the same. And Figure 11 is a side elevation of the outlet valve and stem.

In the drawings I have shown the cylindrical casing on which my vacuum tank is formed as A, having a closure plate B screwed into the lower end thereof, and with an auxiliary tank C screwed onto the bottom of said plate B. An outlet elbow 1 is screwed into the lower end of the tank C to carry the gasoline to the carburetor of the engine and an inlet pipe is connected to the elbow 2, which elbow is screwed into the cover over the top of the tank A, and which carries the gasoline from the supply tank to the vacuum tank by the suction created in the vacuum tank. The said tank A is closed on the top by a cover plate 3, which has a centrally disposed raised cylinder portion 4 on the top thereof and another raised cylindrical portion 5 near one edge thereof. The said cylinder 4 is hollow and has an internal centrally disposed threaded hole $4^a$ in the top thereof by which the entire cap is held in place on the vacuum tank. A rod 6 is screwed into the top of the plate B and into the hole $4^a$ to hold the tank together, and the said rod is also used to support and hold the float F upright in the tank. A slot 7 is cut longitudinally in the said rod 6 and has a catch bar 8 pivoted therein by the pin 9, and the said bar 8 is held in normal position with a catch lug 10 protruding from within the slot on the top side of the bar 8, by the spring 11. The other end of the said bar 8 is formed with an extended lug 12 thereon, which lug is adapted to be moved into the slot 7 by the lower edge of the float F coming into contact with its upper portion. When the bar 8 is thus moved the lug 10 is drawn into the slot, but the minute that the float is raised the spring 11, pressing below the pivot point of the bar, again forces it into its normal position. The float F is made of cork or other suitable float material and has a metal spool portion $F^1$ centrally therethrough, which portion rests against the rod 6. Another spool 15 is also carried on the said rod 6 above the float F and said spool has enlarged ends which engage with a bifurcated lever arm 14.

The bore through the said spool 15 is restricted at its upper end and the restricted portion 13 is that portion which is caught by the lug 10 holding the spool 15 up on the said rod 6 when the float is slowly falling with the outflow of gasoline from the float chamber to the auxiliary tank C. When the float rests upon the lug 12 the spool 15 is released by the movement of the bar 8 and it falls downwardly until the lever arm 14 is moved to its lowest downward position and the spool 15 is then held by resting upon the top side of said arm. The said lever arm 14 is pivoted on the pivot pin 19 between the lugs 17. Another lever arm 20 is fulcrumed on the same pivot pin 19 and is between the bifurcated legs of the arm 14, as shown in Figure 4. One end 20ª of the said lever arm 20 is bent at right angles to the fulcrumed portion of said arm and rests with its upper flat face upon the under side of the arm 14. The other end of the said lever arm 20 is bifurcated and the upper face of the bifurcated portions 21 and 22 are held by a collar 23 of the outlet control valve stem 24 in suspension thereon. The lower end of the said control valve 24 is passed through an outlet hole 25 in the plate B and the lower edge of the said hole is chamfered to form a valve seat 26. The said valve stem 24 has a valve head 27 formed thereon which seats in the seat 26 when the outlet is shut off, and which valve head controls the flow of gasoline from the float chamber to the tank C. The upper portion of the valve stem 24 is longitudinally movable within a guide hole 28 bored in the cylindrical portion 5 of the cap 3. A suction pipe 29 is screwed into a hole 30 bored in the top of the portion 5 of the cap 3 and a suction hole 31 is bored through the cylindrical portion 5 connecting the suction pipe with a valve seat 32. The seat 32 is closed by a valve 33, which valve is carried in the hole 34 bored in the said portion 5, and the said valve 33 has a valve stem 35 thereon which stem opens or closes the valve 33 in its seat 32 by movement actuated by the lever arm 14. The lower end of the said stem 35 is flattened and is pivoted to the said arm 14 by the pin 36, so that the valve 33 closes and opens the hole 31 by the movement of the lever arm 14 and the spool 15. Another valve stem 37 is carried upon the top side of the portion 20ª of the lever arm 20. This valve stem has a valve head 38 formed on the upper end thereof and which head seats in a valve seat 39 chamfered in the top of an air hole 40 bored into the portion 5. The said hole 40 is in open connection with the outer air by the side cut 41 in the portion 5 and the said valve 38 opens and closes the air supply to the interior of the said vacuum tank.

The operation of my device is as follows:
The vacuum tank is connected with the carburetor by a pipe to the elbow 1 and to the gasoline tank by a pipe connecting the tank with the elbow 2. The intake manifold of the engine is then connected with the pipe 29 and the device is ready to operate. When the engine is rotated the suction caused by drawing the gases from the carbureter into the cylinders of the engine is used to create a vacuum suction within the tank A and as the suction of air through the pipe 29, the hole 31 and around the valve 33 sucks all of the air from the tank A and then draws the gasoline into the tank A through the elbow 2 from the supply tank.
At the time when the suction is drawing gasoline into the tank the valve 27 is closed and there is no gasoline leaving the tank to the auxiliary tank, and the valve 38 is also closed so that no air can enter the tank. As the gasoline enters the tank it floats the float F and starts it to rise. As the float rises, it also raises the spool 15 which actuates the lever arm 14 and moves it upwardly, thereby opening the air valve 38, closing the suction valve 33 in its seat 32, and opening the outlet valve 27 from its seat 26, thereby allowing gasoline to flow from the tank into the auxiliary tank C, and from there to the carburetor of the engine. When the float has reached this point the suction is thus shut off and there is no more gasoline drawn into the vacuum tank. The supply in the auxiliary tank is used to provide fuel for the engine and as this supply is used the gasoline flows from the tank A through the hole 25 and the float begins to slowly lower as the gasoline is drawn out of the tank. The dog 10 holds the spool 15 suspended on the rod 6 until the float moves the lug 12 and causes the spool 15 to drop. As the spool drops it lowers the lever arm 14 and opens the suction valve 33, closes the air valve 38, and closes the outlet valve 27. The engine is kept running by the supply in the tank C until the vacuum tank is again filled up by the suction from the intake manifold. An air line pipe 44 is provided in one side of the tank A, in open connection with the tank C and the open air so that gasoline may be drawn from the said tank C and air allowed to enter to prevent any tendency to vacuum in the lower tank and so that the gasoline will flow therefrom freely.

Having thus described my invention I desire to secure by Letters Patent and claim:—

1. In a vacuum tank for automotive vehicles the combination of a casing, having two compartments therein connected by a valve-controlled opening; a float in the top compartment adapted to be raised and lowered by the level of the gasoline in said compartment; a rod on which said float is operated; a spring-operated catch in said rod; a spool carried on said rod above said float; a bifurcated pivoted lever arm having the free ends engaging with the edges of said spool and said lever being actuated by the movement of said spool and indirectly by the movement of said float; a valve in the opening between the two compartments; another lever arm mounted between the arms of the first-mentioned lever arm and pivoted on the same pivot pin, said arm adapted to open and close said valve between the two compartments; an air valve operated by the other end of said last-mentioned lever arm, adapted to open and close an air port into the interior of said top compartment; and a suction control valve operated by said first-mentioned lever arm to control the suction in said upper tank created by the intake manifold of the vehicle.

2. In a vacuum tank the combination of a casing; an auxiliary casing therebelow; a rod mounted between the ends of said casing, having a catch therein; a float movable on said rod; a spool carried on said rod above said float adapted to be caught and held by the catch in said rod, until the casing is partially emptied and the float is lowered sufficiently to actuate the catch and release said spool; and valves controlled by said spool adapted to control the suction, the air release and the gasoline supply to and from said casing as necessary for the operation of said tank.

In testimony whereof I have affixed my signature.

THEODORE BOSSARD.